United States Patent Office 3,395,739
Patented Aug. 6, 1968

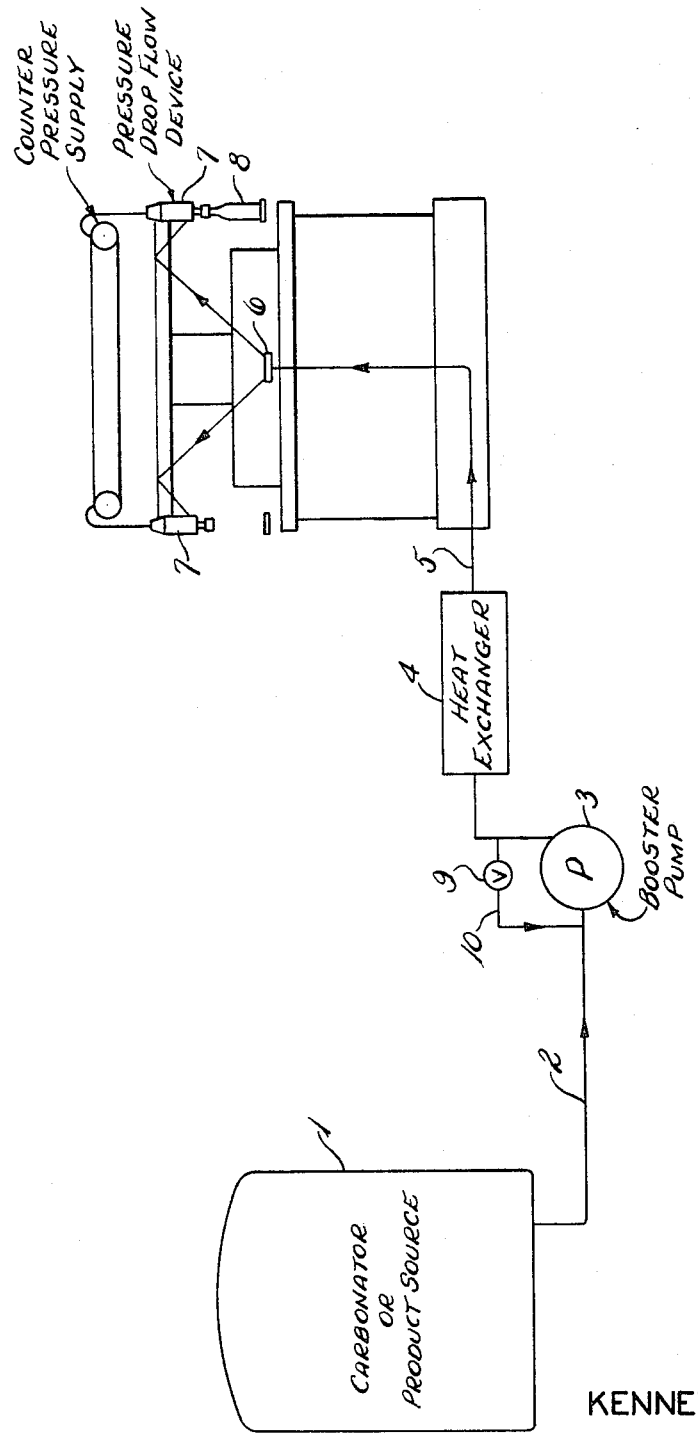

3,395,739
CARBONATED BEVERAGE STABILIZER AND BOTTLE FILLING METHOD
Kenneth F. Friendship, Akron, Ohio, assignor to Geo. J. Meyer Manufacturing Co., Cudahy, Wis., a corporation of Wisconsin
Filed Sept. 30, 1965, Ser. No. 491,690
5 Claims. (Cl. 141—6)

ABSTRACT OF THE DISCLOSURE

Stabilizing carbonated beverages and filling containers therewith where the carbonated beverage is initially produced under one pressure and then the pressure on the carbonated beverage is increased to a higher pressure to render it stable for movement. The carbonated beverage may then be processed under high pressure and ultimately the pressure is reduced to a lower pressure approximating its equilibrium pressure while cooling the beverage. The pressure on the beverage is further reduced to one below its equilibrium pressure immediately prior to container filling action and a residual pressure is maintained thereon which pressure is removed when the container is filled.

---

The present invention relates to a novel and improved method for carbonated beverage stabilization and bottle filling action.

Heretofore there have been many different types of bottle filling machines and processes developed, and such efforts have primarily been directed towards filling bottles rapidly and safely with carbonated beverages with no excessive foaming. The apparatus and methods in use today have functioned relatively satisfactorily, but it always is desirable to fill the bottles more rapidly to reduce bottle filling time and costs. One problem that is always encountered in the filling of any containers with carbonated beverages is that of the production of too much foam in the bottle filling, or container filling action. Another is the inclusion of too much air during the filling process.

Carbonated beverages of the type to which the present invention relates particularly include all carbonated soft drinks, and beer. Wines also may be processed by the new process. These beverages can be processed for filling actions under various pressures and the amount of foaming, or gas release that is produced in processing and filling bottles and containers with the beverages may vary widely. Practical experience shows that the lower the pressure the beverage can be handled during the actual filling process into containers, the lesser quantity of air will be absorbed during the process.

The general object of the present invention is to provide a novel and improved method of stabilizing carbonated beverages so as to secure the carbon dioxide gas more effectively in solution in the beverage to control the foaming of the beverage as it is processed for bottle or container filling action, and the establishment of a more stable product, which can be handled at a lower pressure in the actual bottling process, where the beverage comes into contact with the air which the container will hold prior to being filled.

Another object of the invention is to process carbonated beverages for container filling action so that the beverages can be flowed relatively rapidly through the processing apparatus and system and wherein a greatly increased bottle filling production per machine can be obtained.

Another object of the invention is to increase the pressure upon carbonated beverages after they have been produced whereby the carbonated beverage can be processed more rapidly before reaching the bottle filling machines and the like.

A further object of the invention is to provide a novel process for increasing the speed of the filling of containers by carbonated beverages and for stabilizing such beverages wherein the beverages are subjected to high pressures and that such pressures are reduced, while the temperature of the beverage is maintained or lowered, to a pressure near the equilibrium pressure (fully saturated pressure) of the beverage.

A further object of the invention is to reduce the pressure on a beverage being processed below its equilibrium pressure in the container filling means used in practicing the process of the invention.

Other objects of the invention are to provide a controlled increase in pressure on carbonated beverages after once produced, and then to reduce the pressure on the carbonated beverages appreciably under temperature controlled conditions to improve the stabilization thereof, and to reduce the pressures on carbonated beverage in bottle filling machines or means under controlled conditions.

The foregoing and other objects and advantages of the invention will be made more apparent as the specification proceeds.

Attention now is directed particularly to the accompanying drawing wherein the figure of the drawing shows, in diagrammatic form, apparatus for processing beverages by the novel method of the invention.

When referring to corresponding members shown in the drawing and referred to in the specification, corresponding numerals are used to facilitate comparison therebetween.

Generally speaking, the process of the invention, as one embodiment thereof, relates to one for stabilizing carbonated beverages and for filling bottles, or other containers therewith wherein the carbonated beverage is produced under conventional pressures, and thereafter is subjected to the steps comprising increasing the pressure on the beverage then reducing the pressure on the beverage to a pressure approximately to its equilibrium pressure under temperature control conditions, reducing the pressures on the beverage still further to one below its equilibrium pressure in individual bottle filling means to which the beverage has flowed, filling a bottle with the beverage while maintaining the pressure on the bottled beverage, and removing the remaining pressure on the beverage when the bottle is filled therewith.

The carbonated beverages to which the present invention relates can be produced in any suitable equipment, such as conventional carbonators, as are available commercially today for making various soft drinks and where-in the water, syrup and carbon dioxide gas are thoroughly mixed with some of the gas being dissolved in the water and with some excess gas usually being present in the beverage. Soft drinks may be prepared under varying pressures dependent upon the quantity of $CO_2$ gas dissolved in them. If the beverage being processed is beer, this will also include a liquid with $CO_2$ gas present in association therewith. Some gas not fully dissolved in solution is usually present in either beverage. In all instances, some of the dissolved carbon dioxide gas may be in relatively stable solution, but usually at least some of the carbon dioxide gas is in unstable solution and such gas is relatively easily released from the beverage by any shaking, processing or pressure reductions effected thereon whereby foaming is produced and excessive foaming may very easily result when a slight pressure drop is effected on the beverage or when the beverage is agitated or subjected to velocity changes or movement.

In the accompanying drawing, a conventional carbonator 1 is shown and this carbonator has a tube or pipe 2 extending therefrom connecting to a suitable pump 3 through which the beverage being processed circulates and in which the beverage and fluids carried therewith has the pressure increased thereon to any suitable higher pressure, as desired. Normally the beverage is produced continually in the carbonator 1 and flows as a stream to the pump 3 for pressure increase action thereon. In the booster pump 3 of the invention, the actual pressure required to be derived by this pump will depend very largely upon the beverage being processed, but will usually be within the range of 80 to 120 pounds p.s.i.

The beverage, under increased pressure conditions, then flows to any suitable resistance, or pressure reducing device 4, preferably associated with a chilling device such as an immersed coil or other heat exchanger. This device 4 may be of any conventional design and as the pressure is reduced on the beverage being processed, suitable means are associated with the device 4 to control the temperature of the processed beverage. The pressure dropping device 4 may comprise a heat exchanger that may be built in the form of a plurality of heat exchanger plates and wherein coolant means are associated with the heat exchanger plates and there are restrictions to flow of the beverage provided in the plates for reducing the pressure on the beverage as it flows through the heat exchanger plates and is cooled therein. Or, the device 4 may comprise a relatively small diameter coil which is of such a diameter and length that the fluid friction of the beverage passing through the coil, dependent upon the velocity of the beverage, is such that the desired pressure reducing action is effected on the beverage as it flows through the coil. Such coil normally would be immersed in a suitable refrigerant for desired cooling action on the beverage being processed. Turbulence usually is set up in any liquid flowing through the heat exchanger and this aids in stabilizing the beverage. In this device 4, the beverage flowing thereto may be at any temperature and in the device 4, normally the beverage is reduced in temperature for preference to about 2 to 3° above freezing. In another arrangement, the device 4 could conveniently take the form of a "High-Temperature-Short Time Pasteurizer" in which the product would first be heated under pressure to pasteurizing temperature, held at this temperature for a period, and reduced to a final low temperature for bottling by known means. In which case it would be arranged that the final cooling section of the pasteurizer would form the high resistance to flow and pressure reducing action desirable to effect the necessary stabilization of the product.

In all events, when the process is in operation, the beverage flows continuously from the device 4 through an outlet tube or pipe 5 under reduced pressure conditions depending upon the beverage being processed. From the device 4, the beverage flows through the pipe 5 to a suitable distributor 6 that in turn connects to a plurality of container or bottle filling heads, or stations indicated individually by the number 7. Normally, in bottle and container filling machines, a plurality of these bottle filling stations 7 are provided in the machine whereby a large number of containers can be rapidly filled with the processed beverage. By these means, the resultant filling pressure on the beverage can be reduced to one at or below the equilibrium pressure of the product, that is normally required for holding the amount of gas present in solution in the carbonated beverage under the temperatures to which the beverage is then subjected.

In the process of the invention, the bottle filling stations 7 have suitable means associated therewith whereby bottles or containers 8 are directly engaged thereby and any suitable means may connect to the interior of the bottle to set up suitable counter pressures therein whereby the beverage flowing into the bottles, or containers 8, can be effected under the resultant pressure thereon, usually several lbs. p.s.i. higher than the independent counterpressure supplied to the containers.

From the above, it will be seen that the beverage being processed will flow continuously, and usually relatively rapidly, through the various pipes and other means used in practicing the process of the invention. Automatic means are provided to control the rate of flow of the beverage from the carbonator or storage tank 1, and also the pressure of same in the event of fluctuation and demand by the filling machine 6. This can, by the simplest means, take the form of a bypass relief valve 9 and tube 10 which are connected across the booster pump 3 from the outlet to the inlet end thereof, and this valve 9 can be so adjusted so as to permit flow of the beverage from the high pressure side of the pump back to the low pressure side of the pump in any sufficient volume so that the remaining beverage in volume is sufficient to fulfill the needs of the numerous bottle filling stations 7 provided in the apparatus. It will be seen that the bottle or container filling action can be automatically performed and that the beverage received from the carbonator 1 will all be processed and be directly flowed into containers in the process of the invention.

Tests of the process of the invention have shown that the gas in solution, carbon dioxide, has been stabilized by the processing of the beverage so that the rapid processing thereof for container filling action and the pressure reduction under foam restrictive conditions produces very little or less release of the gas in solution in the beverage than prior art processes.

The pressure increasing step or action of the pump 3 enables the majority of the handling process of the beverage prior to bottling to be carried out while same is in an undersaturated and therefore relatively stable condition, and the pressure reducing and cooling action in the device 4, both materially contribute to this stabilization of the processed beverage, and enabling it eventually to be filled into containers at a minimum pressure and thus avoiding, to a larger extent, the possibility of the beverage to pick up air or oxygen during the process.

As an example of the process, a carbonated beverage could be made in the carbonator 1 at a pressure of about 50 p.s.i. and a temperature of about 35° F. Then the carbonated beverage would have the pressure thereon boosted to about 100 p.s.i. by the pump 2 and be reduced to a pressure of about 35 to 40 p.s.i. at a temperature of about 33° F. when it leaves the heat exchanger 4. The beverage, in flowing through the filling head 6, has its pressure reduced to about 10 p.s.i. as it is flowed into a bottle having a counterpressure of about 6 p.s.i. therein.

The processed beverage may become supersaturated in the heat exchanger 4 but usually it will be at such a pressure, usually one approximating but above its equilibrium pressure, as to be undersaturated until it reaches the filling head. The pressure drop effected in the filling head produces minimum foaming or gas release because of the very small or thin flow zones provided for the beverage in the filling heads. When beer is processed, it normally will be supersaturated when it leaves the heat exchanger 4.

From the foregoing, it will be sen that a novel and different process has been provided by the invention than has been used heretofore in bottle or container filling actions. By flowing the liquid rapidly and continuously through the apparatus, the tubes and other members in the apparatus used tend to be maintained in a clean condition, and the fact that no storage tanks or containers are required in the apparatus reduces the cost of the apparatus and simplifies the processing action. Thus, it is believed that the objects of the invention have been achieved.

Suitable apparatus for practicing the process of the invention is shown in co-pending application Ser. No. 500,863 filed Oct. 22, 1965.

While one complete embodiment of the invention has been disclosed herein, it will be appreciated that modifications of this particular embodiment of the invention may be resorted to without departing from the scope of the invention as defined in the appended claims.

What is claimed is:

1. A process of stabilizing carbonated beverages and filling bottles or other containers therewith wherein the carbonated beverage is produced under suitable pressure and thereafter is subjected to the steps comprising
- increasing the pressure on the beverage to a relatively high pressure,
- reducing the pressure on the beverage to about but above its equilibrium pressure under cooling conditions,
- flowing the beverage to individual bottle filling means,
- further reducing the pressure on the beverage to leave a resultant pressure thereon in the bottle filling means,
- a bottle being engaged by the bottle filling means,
- providing a counterpressure in the bottle less than the resultant pressure on the beverage, and
- filling a bottle with the beverage while maintaining the resultant pressure on the beverage.

2. A process of stabilizing carbonated beverages and filling bottles therewith wherein the carbonated beverage is produced under any suitable pressure and thereafter is subjected to the steps comprising
- increasing the pressure on the beverage to a relatively high pressure to render it stable for movement,
- reducing the pressure on the beverage to a lower pressure approximating its equilibrium pressure while cooling,
- reducing the pressure on the beverage to one below its equilibrium pressure immediately prior to filling a bottle with the beverage while maintaining the residual pressure thereon,
- providing a counterpressure in the bottle less than the resultant pressure on the beverage,
- filling a bottle with the beverage, and
- removing the pressure on the beverage when the bottle is filled.

3. A process of stabilizing carbonated beverages and filling bottles or other containers therewith wherein the carbonated beverage is produced under suitable pressure and thereafter is subjected to the steps comprising
- increasing the pressure on the beverage to between about 80 p.s.i. and 120 p.s.i.,
- reducing the pressure on the beverage to about its equilibrium pressure under cooling conditions and bringing the temperature of the beverage to about 2° to 3° above freezing,
- flowing the beverage to individual bottle filling means,
- further reducing the pressure on the beverage,
- filling a bottle with the beverage while maintaining the resultant pressure on the beverage, and
- removing the pressure on the beverage when the bottle is filled.

4. A process of stabilizing carbonated beverages and filling bottles or other containers therewith wherein the carbonated beverage is produced under suitable pressure and thereafter is subjected to the steps comprising
- increasing the pressure on the beverage to between about 80 p.s.i. and 120 p.s.i.,
- reducing the pressure on the beverage to about its equilibrium pressure under cooling conditions,
- flowing the beverage to individual bottle filling means,
- further reducing the pressure on the beverage to leave a resultant pressure thereon in the bottle filling means,
- a bottle being engaged by the bottle filling means,
- providing a counterpressure in the bottle less than the resultant pressure on the beverage,
- filling a bottle with the beverage while maintaining the resultant pressure on the beverage, and
- removing the pressure on the beverage when the bottle is filled.

5. A process of stabilizing carbonated beverages and filling bottles or other containers therewith wherein the carbonated beverage is produced under suitable pressure and thereafter is subjected to the steps comprising
- increasing the pressure on the beverage to between about 80 p.s.i. and 120 p.s.i.,
- reducing the pressure on the beverage to about its equilibrium pressure while creating some turbulence in the beverage,
- flowing the beverage to individual bottle filling means,
- further reducing the pressure on the beverage to a resultant pressure of about 10 p.s.i in the bottle filling means.
- a bottle being engaged by the bottle filling means,
- providing an independent counterpressure in the bottle less than the resultant pressure on the beverage,
- filling a bottle with the beverage while maintaining the resultant pressure on the beverage, and
- removing the pressure on the beverage when the bottle is filled.

References Cited

UNITED STATES PATENTS

| | | | |
|---|---|---|---|
| 2,695,743 | 11/1954 | Wetherby–Williams | 141—40 X |
| 2,840,098 | 6/1958 | Breeback | 137—170.1 |
| 3,090,408 | 5/1963 | Naecker | 141—57 |

LAVERNE D. GEIGER, *Primary Examiner.*

E. J. EARLS, *Assistant Examiner.*